United States Patent [19]

Vrnak et al.

[11] Patent Number: 5,894,404
[45] Date of Patent: Apr. 13, 1999

[54] CIRCUIT BREAKER PANELBOARD ENCLOSURE

[75] Inventors: Thomas F. Vrnak, Chapel Hill; Kevin D. Mazzella, Durham; Kevin F. Nolan, Hillsborough, all of N.C.

[73] Assignee: General Electric Company, Schenectady, N.Y.

[21] Appl. No.: 08/864,167

[22] Filed: May 28, 1997

[51] Int. Cl.[6] .................................................. H05K 7/16
[52] U.S. Cl. .......................... 361/627; 361/628; 361/631; 361/673; 361/643; 361/647; 361/652; 361/655; 361/656; 174/52.1; 248/906; 200/293; 200/296
[58] Field of Search .............................. 361/627, 628, 361/630, 824, 673; 174/52.1; 248/906; 200/293, 296

[56] References Cited

U.S. PATENT DOCUMENTS

| | | | |
|---|---|---|---|
| 2,576,396 | 11/1951 | Green | 361/627 |
| 4,752,233 | 6/1988 | Morby et al. | 439/212 |
| 5,081,560 | 1/1992 | Donnerstag | 361/644 |
| 5,172,300 | 12/1992 | Morby et al. | 361/355 |

*Primary Examiner*—Leo P. Picard
*Assistant Examiner*—Boris L. Chervinsky
*Attorney, Agent, or Firm*—Cantor Colburn LLP; Carl B. Horton

[57] ABSTRACT

A circuit breaker panelboard enclosure is adapted to receive circuit breaker covers that are attached to the interior or circuit breaker module without requiring attachment screws and the like. The circuit breaker modules within the enclosure are equipped with electrically-insulative extension clips that are received and retained within apertures formed in the circuit breaker covers in press-fit relation. The circuit breaker covers are removed by grasping the ends of the circuit breaker covers and pulling the circuit breaker covers away from the enclosure.

12 Claims, 4 Drawing Sheets

CIRCUIT BREAKER PANELBOARD ENCLOSURE

BACKGROUND OF THE INVENTION

Industrial-rated circuit breakers, contained within switchboard and panelboard enclosures of the type described within U.S. Pat. No. 5,172,300 entitled "Electric Power Distribution Panelboard-Switchboard Assembly", are usually installed within the enclosures on site. The enclosures include a number of circuit breaker covers that are temporarily removed to allow for circuit breaker installation and are later attached to the cover supports.

The circuit breaker covers are in the form of sheet metal plates having apertures formed therein for egress of the circuit breaker operating handles to allow manual intervention and control of the circuit breaker internal operating components. The ends of the circuit breaker covers are usually screwed or otherwise attached to the cover supports.

In accordance with state and local electric codes, the face covers are usually made inaccessible by means of a hinged door assembly which must be opened to access the circuit breaker handles. For circuit breaker installation on site, the face covers must be removed to access the interior of the enclosure and to install the circuit breakers within the respective circuit breaker modules that include the stab receptacles and connectors. When large-sized panelboards are involved, the face plates are unscrewed and the circuit breakers are installed, on site. The face covers then must be re-installed at a great expense of time and effort.

Accordingly, one purpose of the invention is to provide an arrangement whereby the circuit breaker covers used within panelboard enclosures can be easily and readily removed with the least amount of time and effort.

SUMMARY OF THE INVENTION

A circuit breaker panelboard enclosure is adapted to receive circuit breaker covers that are attached to the interior or circuit breaker module without requiring attachment screws and the like. The circuit breaker modules within the enclosure are equipped with electrically-insulative extension clips that are received and retained within apertures formed in the circuit breaker covers in press-fit relation. The circuit breaker covers are removed by grasping the ends of the circuit breaker covers and pulling the circuit breaker covers away from the enclosure.

DESCRIPTION OF THE PREFERRED EMBODIMENT

Figure 1:
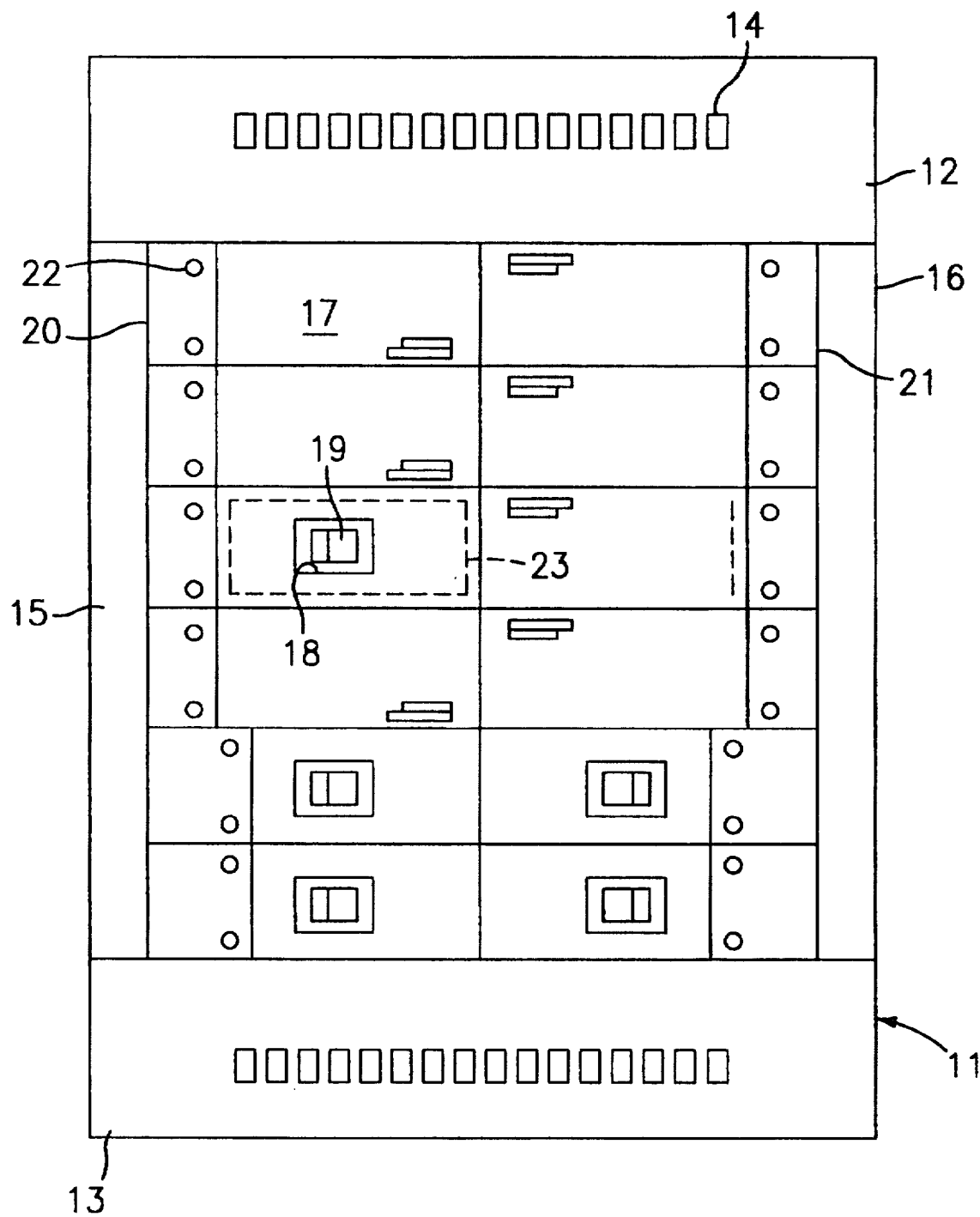
FIG. 1 is a plan view of a circuit breaker panel board enclosure of the art.

Before describing the face plate attachment of the invention, it is helpful to review tile panelboard enclosure 10 as shown in FIG. 1 according to the Prior Art. A complete description is found within the aforementioned U.S. Pat. No. 5,172,300. The enclosure 10 is in the form of a metal cabinet II having a top plate 12 and bottom plate 13 joined by opposing side plates 15 and 16 as indicated. The air vents 14 provide induction cooling of the interior of the enclosure. The circuit breaker covers 17 extend across the side plates and include openings 18 to allow for the egress of the operating handles 19 of the circuit breakers 23 contained therein. Tile circuit breaker covers 17 are attached to the circuit breaker cover supports 20, 21 by means of screws as indicated at 22.

Figure 2:
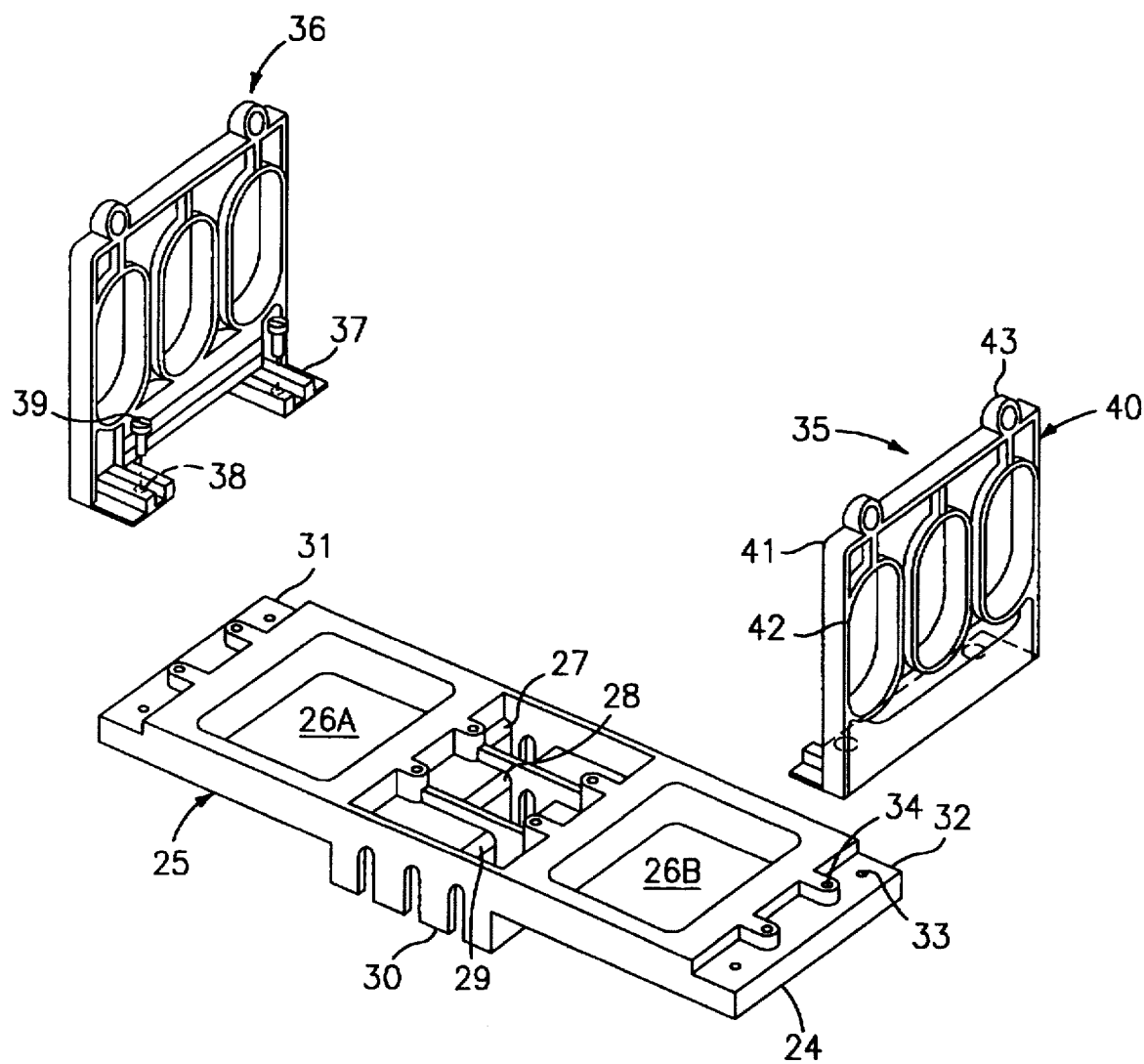
FIG. 2 is a perspective view of a circuit breaker support module and cover supports in accordance with the present invention.

The circuit breaker support module 24 shown in FIG. 2 is similar to that described within U.S. Pat. No. 4,752,233 entitled "Electric Power Panelboard Adapter Module" and is in the form of a molded thermoset plastic frame 25 that defines a pair of rectangular circuit breaker recesses 26A, 26B for receiving the circuit breaker stabs (not shown) and smaller recesses 27–29 for receiving the circuit breaker load straps. Opposing steps 31, 32 at the ends of the frame include threaded openings 33 for attaching the cover supports 35, 36 along with thru-holes 34 for attaching the module to the panelboard interior. The depending shields 30 integrally-formed therein provide over-surface clearance between the circuit breaker stabs and the panelboard interior. In further accordance with the invention, the cover supports 35, 36 consist of a molded plastic frame 40 that defines an outer rectangle 41 with three or more elongated rings 42 for strength while maintaining flexibility. A lip 37 extending from the bottom of the frame includes thru-holes 38 for attaching the side supports to the module via threaded openings 33 and screws 39. The clips 43 integrally-formed on the top of the frame 40 are received within the small rectangular openings 52 formed within the cover 44 when the cover is fitted to the panelboard 10 as shown in phantom in FIG. 4.

Figure 3:
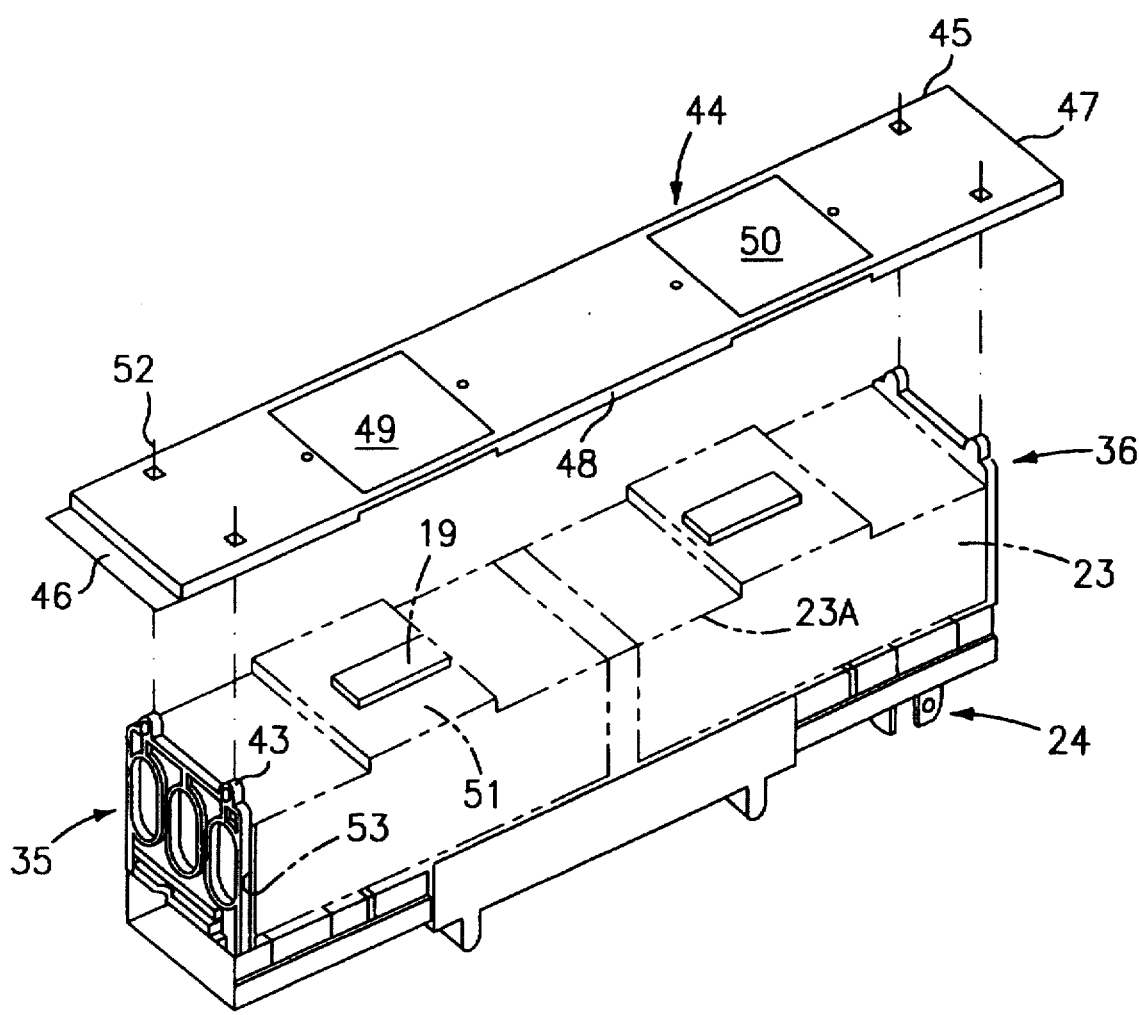
FIG. 3 is a perspective view of a circuit breaker support module showing installation of a cover.

As best seen by referring now to FIG. 3, the cover 44 defines a metal or plastic face plate 45 that includes shelves 46, 47 at opposite ends thereof along with a downwardly extending perimetric rim 48 that engages the outer edges of the cover 23A of the circuit breaker 23 shown in phantom. The face plate supports 35, 36 closely abut the endwalls 53 of the circuit breaker 23 when the face plate supports are attached to the module 24. With the module 24 attached within the interior of the panelboard enclosure 10 of FIG. 4, the openings 52 formed within the cover 44 are aligned with the clips 43 extending from the face plate supports 35, 36 such that the rectangular openings 49, 50 in the overlay the escutcheons 51 that contain the circuit breaker operating handles 19 on the circuit breaker 23.

Figure 4:
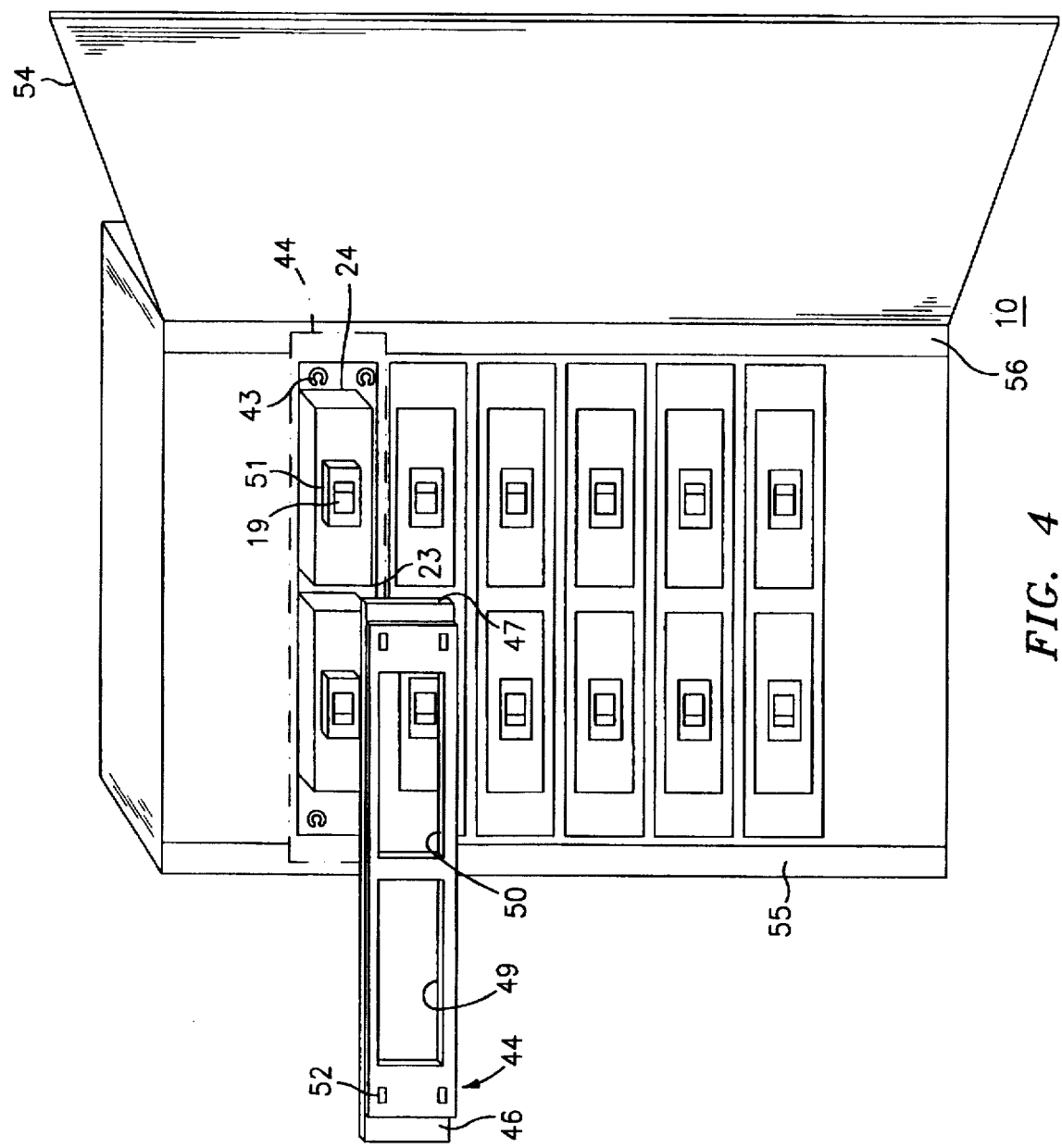
FIG. 4 is a plan view of a circuit breaker panel board panel enclosure showing installation of a cover.

The panelboard enclosure 10 shown in FIG. 4 with the door 54 open to reveal the circuit breaker modules 24 connected within the interior of the panelboard enclosure. The cover 44 is depicted in solid lines prior to attachment to he panelboard enclosure and in phantom after attachment thereto. With the modules 24 attached to the interior, the escutcheons 51 and the operating handles 19 on the circuit breakers 23 extend outwards from the interior. Tile apertures 52 are entrapped within the clips 43 and the escutcheons 51 and operating handles 19 extend therethrough the rectangular openings 49, 50 for easy access thereto. With the covers 44 in position on the panelboard enclosure 10, the shelves 46, 47 on the ends of the covers abut against the enclosure side plates 55, 56.

A panelboard interior cover that cooperates with the circuit breaker support module to provide quick and efficient access to the panelboard interior has herein been disclosed. The covers are press-fit onto plastic clips that are attached to the support modules for ease in both attachment and removal of the covers.

We claim:

1. A circuit breaker support module for installation into a circuit breaker panelboard enclosure, the circuit breaker support module comprising:

a molded plastic circuit breaker support frame receiving a pair of circuit breakers;

a pair of rectangular openings within said circuit breaker support frame and arranged for receiving circuit breaker stab connectors;

a pair of apertures arranged on opposing ends of said circuit breaker support frame for providing attachment to a panelboard enclosure;

a pair of molded plastic cover support frames, one of said cover support frames being arranged at each end of said circuit breaker support frame;

at least one lip arranged on a bottom of said cover support frame for attaching to said circuit breaker support frame;

at least one clip extending from a top of each of said cover support frames; and a circuit breaker cover plate having slots arranged therein to removably engage said at least one clip to cover of said pair of circuit breakers.

2. The circuit breaker support module of claim 1 wherein said cover support frames comprise a rectangular configuration.

3. The circuit breaker support module of claim 2 including elongated rings integrally-formed within said rectangular configuration.

4. The circuit breaker support module of claim 2 wherein said at least one lip comprises a pair of lips formed at one end of said rectangular configuration for attachment between said cover support frames and said circuit breaker support frame.

5. The circuit breaker support module of claim 4 wherein said at least one clip comprises a pair of clips extending from an opposite end of said rectangular configuration for attachment with said circuit breaker cover plate.

6. The circuit breaker support module of claim 5 wherein said pair of clips are received within said slots arranged within said circuit breaker cover plate in press-fit relation.

7. A circuit breaker panelboard comprising a panelboard enclosure;

a plurality of circuit breakers arranged on circuit breaker support modules within said panelboard enclosure;

a pair of apertures arranged on opposing ends of said circuit breaker support modules providing attachment said panelboard enclosure;

a pair of first and second molded plastic cover support frames, said first cover support frame positioned at one end of said circuit breaker support modules and said second cover support frame positioned at an opposite end of said circuit breaker support modules;

a plurality of circuit breaker cover plates arranged over said circuit breaker support modules, said circuit breaker cover plates including operating handle apertures for providing access to circuit breaker operating handles extending from said circuit breakers and cover support frame apertures for attaching said cover plates with said cover support frames.

8. The circuit breaker panelboard of claim 7 wherein said cover support frames comprise a rectangular configuration.

9. The circuit breaker panelboard of claim 8 including elongated rings integrally-formed within said rectangular configuration.

10. The circuit breaker panelboard of claim 9 including a lip formed at one end of said rectangular configuration for attachment between said cover support frames and said circuit breaker support frame.

11. The circuit breaker panelboard of claim 10 including a clop extending from an opposite end of said rectangular configuration for attachment with one of said circuit breaker cover plates.

12. The circuit breaker panelboard of claim 11 wherein said clip is received within an aperture within said circuit breaker cover plate in press-fit relation.

* * * * *